United States Patent
Browning et al.

(10) Patent No.: US 6,214,248 B1
(45) Date of Patent: Apr. 10, 2001

(54) METHOD OF FORMING HOLLOW CHANNELS WITHIN A COMPONENT

(75) Inventors: Janel Koca Browning, El Cajon, CA (US); Melvin Robert Jackson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/190,070

(22) Filed: Nov. 12, 1998

(51) Int. Cl.[7] .............................. B31D 3/00; B23P 15/00
(52) U.S. Cl. ........................ 216/56; 216/17; 216/18; 216/39; 29/889.721
(58) Field of Search ............................ 216/17, 18, 39, 216/56, 106; 29/889.721

(56) References Cited

U.S. PATENT DOCUMENTS

| | | | |
|---|---|---|---|
| 4,956,037 | * 9/1990 | Vivaldi | 156/155 |
| 5,249,357 | * 10/1993 | Holmes et al. | 29/890.01 |
| 5,626,462 | * 5/1997 | Jackson et al. | 416/97 R |
| 5,640,767 | * 6/1997 | Jackson et al. | 29/889.721 |
| 5,820,337 | * 10/1998 | Jackson et al. | 415/200 |

\* cited by examiner

*Primary Examiner*—Randy Gulakowski
*Assistant Examiner*—Shamim Ahmed
(74) *Attorney, Agent, or Firm*—Noreen C. Johnson; Douglas E. Stoner

(57) ABSTRACT

A method of forming an internal channel within an article, such as a cooling channel in an air-cooled blade, vane, shroud, combustor or duct of a gas turbine engine. The method generally entails forming a substrate to have a groove recessed in its surface. A solid member is then placed in the groove, with the solid member being sized and configured to only partially fill the groove so that a void remains in the groove. The void is then filled with a particulate material so that the groove is completely filled. A layer is then deposited on the surface of the substrate and over the solid member and the particulate material in the groove, after which at least the solid member is removed from the groove to form the channel in the substrate beneath the layer.

18 Claims, 4 Drawing Sheets

METHOD OF FORMING HOLLOW CHANNELS WITHIN A COMPONENT

BACKGROUND OF THE INVENTION

Higher operating temperatures for gas turbine engines are continuously sought in order to increase their efficiency. However, as operating temperatures increase, the high temperature durability of the components of the engine must correspondingly increase. Significant advances in high temperature capabilities have been achieved through formulation of iron, nickel and cobalt-based superalloys, though components formed from such alloys often cannot withstand long service exposures if located in certain sections of a gas turbine engine, such as the turbine, combustor or augmentor.

A common solution is to provide internal cooling of turbine, combustor and augmentor components, at times in combination with a thermal barrier coating. Airfoils of gas turbine engine blades and vanes often require a complex cooling scheme in which cooling air flows through cooling channels within the airfoil and is then discharged through carefully configured cooling holes at the airfoil surface. Convection cooling occurs within the airfoil from heat transfer to the cooling air as it flows through the cooling channels. In addition, fine internal orifices can be provided to direct cooling air flow directly against inner surfaces of the airfoil to achieve what is referred to as impingement cooling, while film cooling is often accomplished at the airfoil surface by configuring the cooling holes to discharge the cooling air flow across the airfoil surface so that the surface is protected from direct contact with the surrounding hot gases within the engine.

In the past, cooling channels have typically been integrally formed with the airfoil casting using relatively complicated cores and casting techniques. More recently, U.S. Pat. Nos. 5,626,462 and 5,640,767, both to Jackson et al. and commonly assigned with the present invention, teach a method of forming a double-walled airfoil by depositing an airfoil skin over a separately-formed inner support wall (e.g., a spar) having surface grooves filled with a sacrificial material. After the airfoil skin is formed, preferably by such methods as electron-beam physical vapor deposition (EBPVD) or plasma spraying, the sacrificial material is removed to yield a double-walled airfoil with cooling channels that circulate cooling air against the interior surface of the airfoil skin.

The sacrificial material must be carefully selected to withstand the skin deposition temperature, typically about 1000 to 1200° C., and have adequate thermal conductivity to prevent overheating of the deposition (spar) surface. In addition, the sacrificial material must be deposited to completely fill the surface grooves of the spar, and have a coefficient of thermal expansion (CTE) that is at least as high as that of the spar to prevent shrinkage of the sacrificial material away from the groove wall during deposition of the airfoil skin. If incomplete fill or shrinkage occurs, a gap will be present between the sacrificial material and the groove wall during skin deposition, which, if sufficiently large, leads to an unacceptable surface defect in the airfoil skin. Airfoil skins deposited by EBPVD are particularly sensitive to surface discontinuities due to the atom-by-atom manner in which the coating is built up. For example, gaps of less than up to about 2 mils (about 50 Fm) can be tolerated by plasma-sprayed airfoil skins, while gaps should not be larger than about 0.5 mil (about 13 Fm) for airfoil skins deposited by EBPVD.

For the above reason, sacrificial materials in the form of a solid shaped to fit a surface groove of a spar are unacceptable, because of the inherent likelihood of a gap between the solid and the groove wall. Consequently, and as shown in FIGS. 1 through 3, Jackson et al. teach that a sacrificial material 12 is deposited in the surface groove 14 of a spar 10 in excess amounts, with the excess being removed by machining or another suitable technique so that the surface of the sacrificial material 12 is flush with the surrounding surface of the spar 10. Depending on its composition, the sacrificial material 12 can be removed after deposition of the airfoil skin 16 by melting/extraction, chemical etching, pyrolysis or another suitable method.

As is evident from FIG. 3, though a sacrificial material 12 having the desired physical properties outlined above can be deposited to completely fill the groove 14, a problem arises because the groove 14 inevitably has rounded corners and edges, particularly if formed by casting or machining. As a result, even if the sacrificial material 12 completely fills the groove 14 and does not shrink to form a gap during deposition of the airfoil skin 16, removal of the material 12 leaves a sharp (<90°) notch 18 between the skin 16 and the wall of the groove 14. Cracks will tend to initiate from this notch 18, and thereafter propagate between the airfoil skin 16 and spar 10.

In view of the above, it can be seen that it would be desirable if a method were available that could ensure adequate filling of the groove prior to deposition of the airfoil skin, while also eliminating notches that could serve as the source of cracks between the skin and spar.

BRIEF SUMMARY OF THE INVENTION

According to the present invention, there is provided a method of forming an internal channel in an article, and particularly a cooling channel in an air-cooled component, such as a blade, vane, shroud, combustor or duct of a gas turbine engine. The method generally entails forming a substrate to have a groove recessed in its surface. A solid member is then placed in the groove, with the solid member being sized and configured to only partially fill the groove so that a void remains in the groove. The void is then filled with a particulate fill material so that the groove is completely filled. A layer is then deposited on the surface of the substrate and over the solid member and the fill material in the groove, after which at least the solid member is removed from the groove to form a channel in the substrate beneath the layer.

In one embodiment of the invention, the solid member and fill material are consolidated so that the fill material forms a solid mass that is bonded to the substrate, and only the solid member is removed from the groove so that the solid mass remains and forms a wall of the channel. In an alternative embodiment, the groove is formed so that its edge at the surface of the substrate projects over the groove, and the solid member and fill material are both removed from the groove to form the channel. With each embodiment, the tendency is greatly reduced for a sharp notch to be present within the channel between the substrate and layer. In the first embodiment, the fill material fills the notch formed between the layer and the rounded edge of the groove, while in the second embodiment the groove is configured to eliminate the notch. Accordingly, with each embodiment, removal of a sacrificial filler (i.e., the solid member and optionally the fill material) from the groove does not leave a sharp notch from which cracks are likely to initiate and propagate between the layer and substrate.

In another embodiment, a channel is formed in an article by steps of forming a substrate having a surface and a groove recessed in the surface, placing a solid member in the groove so as to partially fill the groove and leave a void therein, filling the void with a fill material so that the groove is completely filled, depositing a layer on the surface of the substrate and over the solid member and the fill material in the groove and then removing at least the solid member from the groove so as to form a channel in the substrate and beneath the layer. The fill material can be removed from the groove after the depositing step. The groove can be formed to have an edge at the surface of the substrate, the edge projecting over the groove.

Other objects and advantages of this invention will be better appreciated from the following detailed description.

DETAILED DESCRIPTION OF THE INVENTION

The present invention is generally applicable to any component in which an internal channel is desired. The advantages of this invention are particularly applicable to gas turbine engine components that employ internal cooling to maintain their service temperatures at an acceptable level. Notable examples of such components include shrouds, combustors, ducts and airfoils of high and low pressure turbine vanes and blades.

Figure 1:
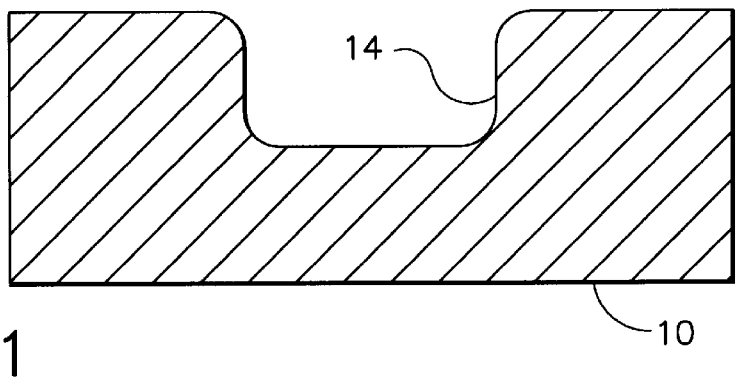
FIGS. 1 through 3 illustrate process steps when forming a cooling channel below the skin of a double-walled airfoil in accordance with the prior art.
Figure 2:
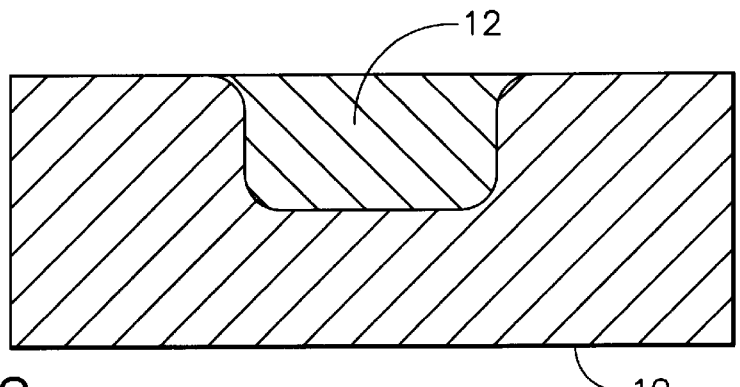
Figure 3:
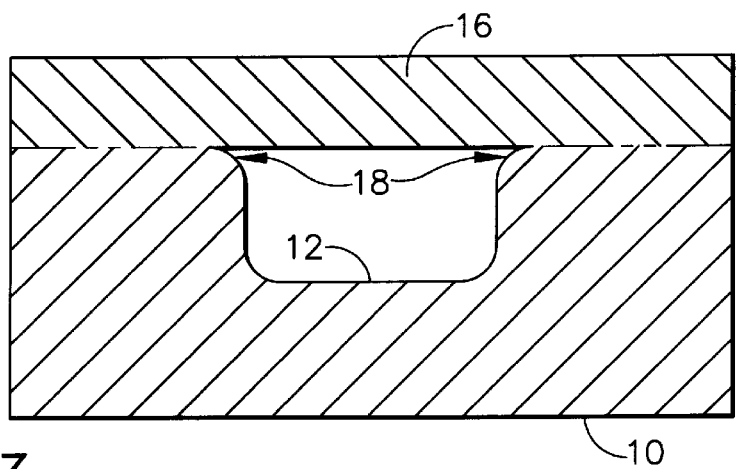
Figure 4:
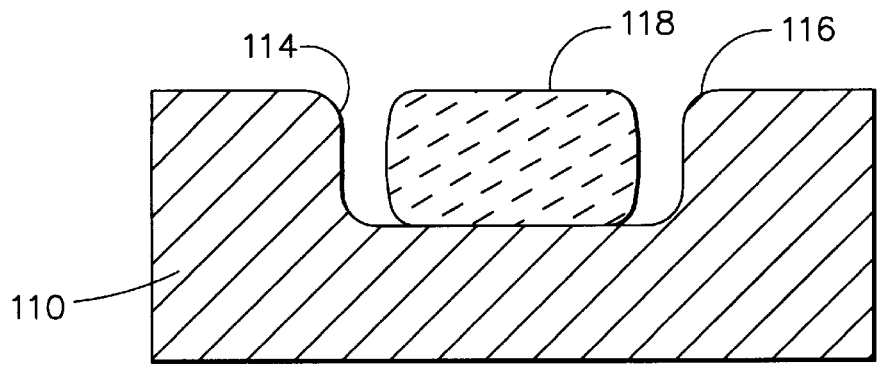
FIGS. 4 through 6 illustrate process steps when forming a cooling channel below the skin of a double-walled airfoil in accordance with a first embodiment of the present invention.
Figure 5:
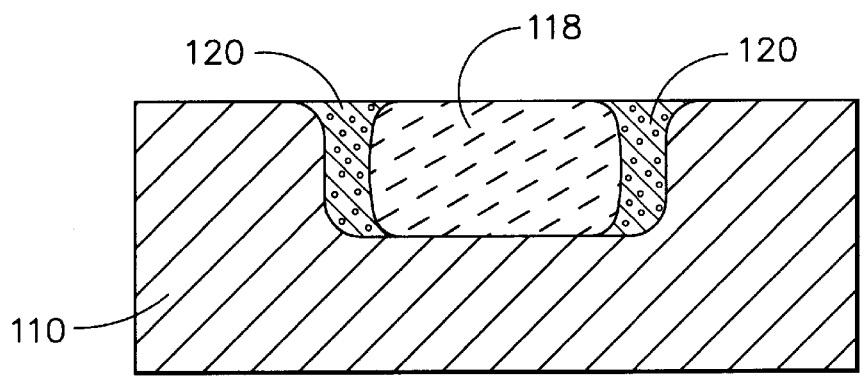
Figure 6:
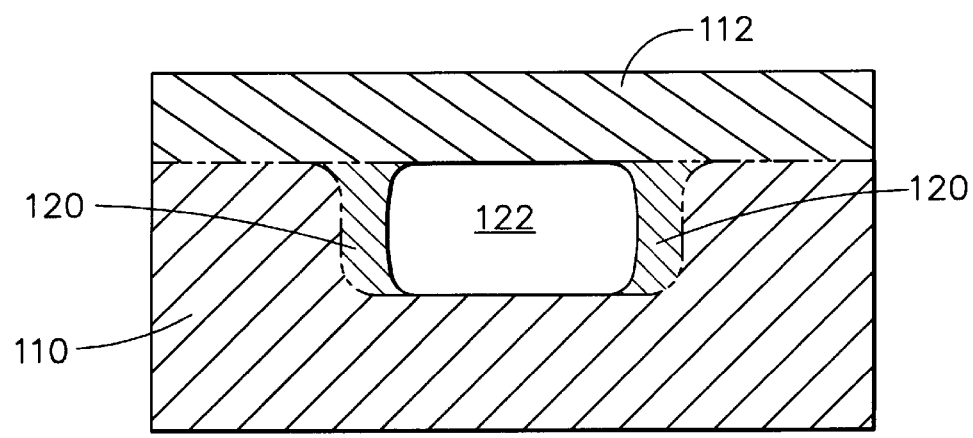

Referring to FIGS. 4 through 6, the method of this invention will be described in terms of a component, such as a turbine vane or blade airfoil, having a double-walled construction formed by the deposition of an airfoil skin 112 over a substrate 110, such as a cast spar, having a groove 114 formed in its outer surface 116. The groove 114 will typically have a rectilinear cross-section and extend in the longitudinal direction of the airfoil, though it is foreseeable that the groove 114 could have any configuration suitable for a particular component.

The method is generally an improvement of the method disclosed in U.S. Pat. Nos. 5,626,462 and 5,640,767, both to Jackson et al., which are incorporated herein by reference. As seen in FIG. 4, the edge of the groove 114 is rounded as a result of the manner in which the groove 114 was formed, e.g., casting or machining. As previously noted, the rounded edge would define a sharp (less than 90°) notch with the skin 112 overlying the groove 114. In accordance with a first embodiment of this invention, sharp notches are prevented by the combined use of a sacrificial solid filler 118 and a particulate filler 120, which together completely fill the groove 114 as shown in FIG. 5. After deposition of the skin 112, the solid filler 118 is removed to form a cooling channel 122. The particulate filler 120 remains in the groove 114 to form a permanent wall portion of the channel 122.

As is evident from FIGS. 4 and 5, the solid filler 118 is slightly undersized for the groove 114, creating a void or gap between the filler 118 and the walls of the groove 114. The use of a preformed solid filler 118 is advantageous because the final cross-sectional shape of the channel 122 can then be predetermined, particularly for the purpose of eliminating the aforementioned sharp notch. Suitable materials for the solid filler 118 must be compatible with that of the substrate 110 in terms of CTE, thermal conductivity and composition. Specifically, the solid filler 118 must have a CTE sufficiently close to the substrate 110 to prevent the formation of an excessive gap during deposition of the skin 112, a sufficiently high thermal conductivity to prevent overheating of its surface during the deposition step, and a composition that is compatible with the substrate 110 to the extent that detrimental interdiffusion during the consolidation and deposition steps is minimized. If the substrate 110 is formed of a nickel-based alloy, including nickel-based superalloys, suitable materials for the solid filler 118 include other nickel-based alloys and certain iron alloys, including steel. In a preferred embodiment, the solid filler 118 is removed by etching, necessitating that the solid filler 118 is formed of a material that can be preferentially etched from the substrate 110. For substrates 110 formed of nickel-based superalloys, a preferred material for the solid filler 118 is MONEL7, having a nominal composition of 70Ni-30Cu, though iron and steel alloys can also be preferentially etched from a nickel-based superalloy. MONEL7 and suitable iron and steel alloys have melting temperatures greater than 1200° C. and high thermal conductivities, e.g., at least 0.5 cal/cm·s·K at temperatures above 1000K. MONEL7 has a CTE that is comparable to that of nickel-based alloys, though bcc iron and steels are notably lower and may not be suitable for use with a nickel-based substrate. Austenitic iron-based alloys have higher CTEs than bcc iron, and may be adequate. Steels, bcc iron alloys and other lower-CTE materials may be appropriate fill materials for substrates 110 formed of intermetallic and composite materials.

As shown in FIG. 5, the particulate filler 120 fills the gap between the solid filler 118 and the walls of the groove 114 so that the groove 114 is completely filled prior to deposition of the skin 112. The groove 114 is preferably filled so that the material within forms a surface substantially coplanar with the surrounding surface 116 of the substrate 110, such that the skin 112 deposited on the substrate 110 will not form a depression over the groove 114. As shown in FIGS. 4 and 5, the thickness of the solid filler 118 is such that its upper surface is substantially coplanar with the surrounding surface 116 of the substrate 110, so that the skin 112 is deposited directly on the surface of the solid filler 118, so that the particulate filler 120 is limited to surrounding the solid filler 118 within the groove 114.

According to this embodiment of the invention, the particulate filler 120 forms a permanent wall portion of the channel 122, and therefore must be compatible with the substrate 110 in terms of composition and physical properties. In particular, the particulate filler 120 must be capable of being consolidated within the groove 114 to yield a fill that can withstand the operating temperatures of the skin 112, and will not degrade the surrounding substrate 110 from interdiffusion. Suitable materials for the particulate filler 120 include powders of NICHROME7 (nominally 60Ni-24Fe-16Cr-0.1C), NiAl intermetallic and NiCrAlY, each of which are high temperature materials having compositions that are sufficiently similar to that of nickel-based superalloys for use with substrates 110 formed of such materials.

Alternatively, the particulate filler 120 could be formed of a partitioned alloy braze powder, such as a blend of a nickel-based superalloy powder and a second powder of the same or similar superalloy powder with additions of a melting point depressant, such as boron or silicon. Upon heating to a temperature above the melting point of the second powder but below that of the first powder and substrate, the second powder melts and flows by capillarity to fill interstices between the unmelted powder particles. There is at least a partial dissolution of the higher-melting powder and the substrate into the lower-melting powder until the composition of the melt is altered enough that its melting point is increased and freezing occurs. This approach can be used where the substrate 110 and skin 112 are formed of a niobium-based intermetallic composite, in which case the filler 120 is a partitioned alloy that includes a lower-melting powder high in silicon and boron.

Consolidation of the particulate filler 120 within the groove 114 can be achieved using various techniques. Notable methods include an electroconsolidation process commercially available through Superior Graphite, a process referred to as pneumatic isostatic forging (PIF) developed by Forged Performance Products, Inc. (FPPI), and a fluidized powder hot load transfer medium process available through Ceracon, Inc. The first mentioned consolidation process employs graphite as both a pressure transmitting medium and an electrical resistor for heat generation. This process advantageously does not require dies and enables rapid powder consolidation without the need for canning or cladding. The PIF process uses liquefied argon to quickly apply pressures of up to about 60 ksi (about 4000 bar), enabling densification and consolidation to occur at relatively low temperatures (about 800 to 900° C.). Finally, the Ceracon process uses a powder medium to transmit pressure to the material being consolidated.

Figure 10:
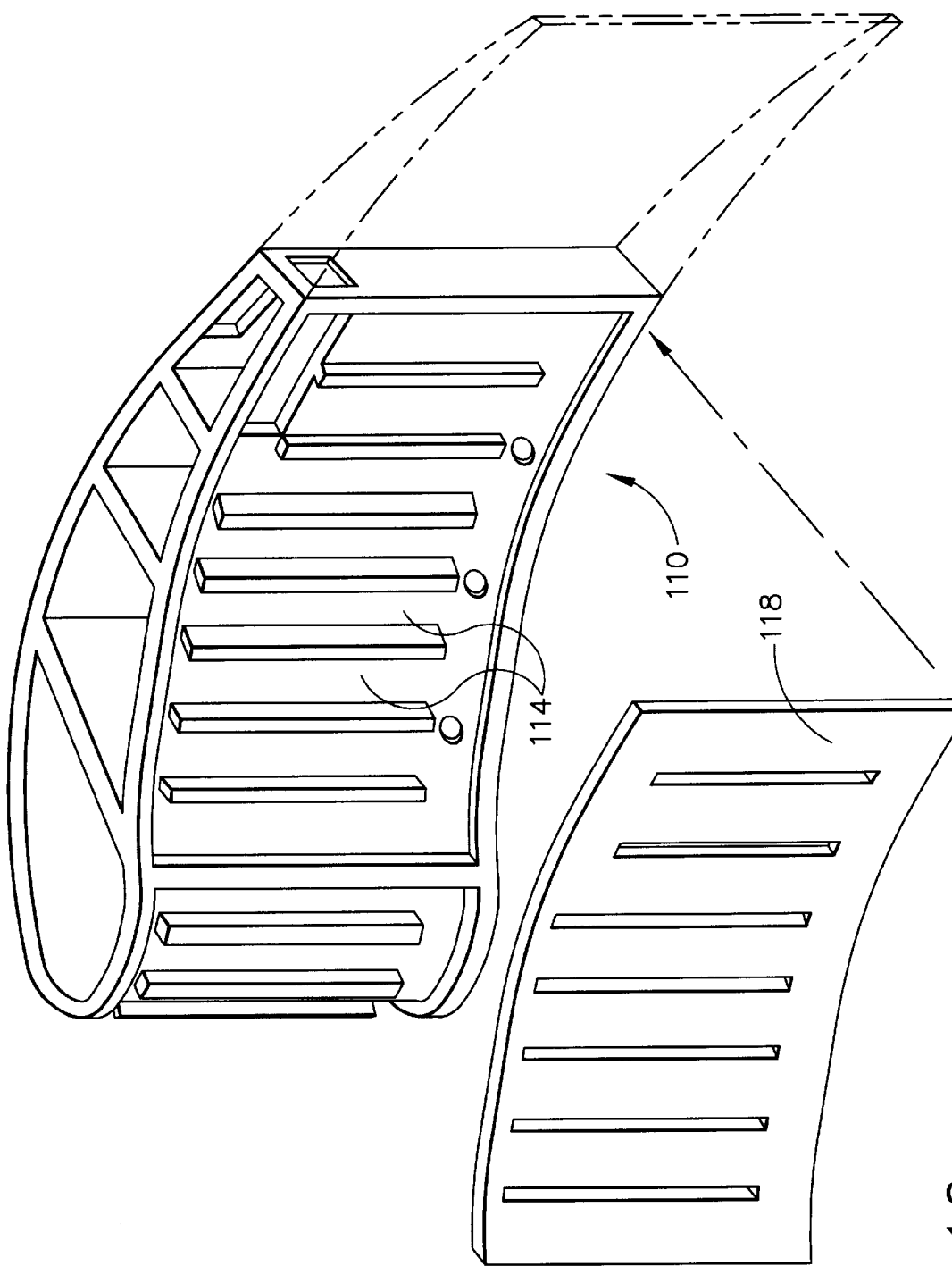
FIG. 10 illustrates an airfoil and solid filler employed by the method of this invention.

Each of the above consolidation processes entails similar pre-processing steps. In the processing of an airfoil intended to have multiple cooling channels, as shown in FIG. 10, the solid filler 118 would be manufactured to have a number of sections that nest within an appropriate number of grooves 114 on the substrate (spar) 110. The particulate filler 120 would then be used to fill the gaps within the grooves 114 around the filler 118, and then the assembly appropriately fixtured for consolidation using the desired consolidation process. To facilitate filling of the gaps, the particulate filler 120 is preferably dispersed in a binder that is burned off during consolidation and does not leave a detrimental residue. Typically, surplus particulate filler 120 is used to allow for compaction of the filler 120 during consolidation. Consolidation is carried out to densify the particulate filler 120 and bond the resulting mass to the substrate 110. As shown in FIG. 5, the final level of the fill within the groove 114 is level with the surrounding surface 116 of the substrate 110.

After consolidation (FIG. 5), the skin 112 is deposited by any suitable method. For airfoils and other gas turbine engine components having a nickel-base superalloy spar (substrate 110), preferred materials for the skin 112 include nickel-base superalloys, NiAl and NiAl-intermetallic composite alloys, and superalloy matrix composites. For niobium-base suicide composite spars, preferred materials for the skin 112 include similar niobium-base silicide composites, with composition and phase fractions adjusted to achieve the greater oxidation resistance required for the higher service temperature skin. Skins 112 of these materials can be deposited by plasma spraying and physical vapor deposition (PVD) techniques such as electron beam physical vapor deposition (EBPVD). A preferred EBPVD technique is that disclosed in U.S. Pat. No. 5,474,809, incorporated herein by reference. After deposition of the skin 112, the solid filler 118 can be removed by etching without damaging the substrate 110 or skin 112. A suitable etchant for preferentially etching a MONEL7 solid filler 118 from a nickel-based superalloy substrate 110 is 10% to 50% nitric acid in water.

Figure 7:
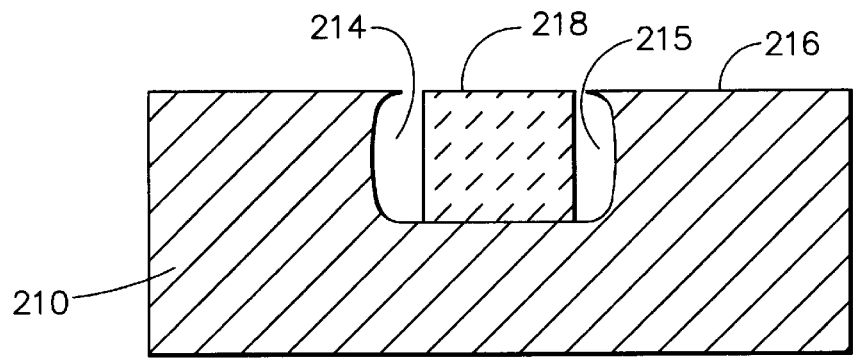
FIGS. 7 through 9 illustrate process steps when forming a cooling channel in accordance with a second embodiment of the present invention.
Figure 8:
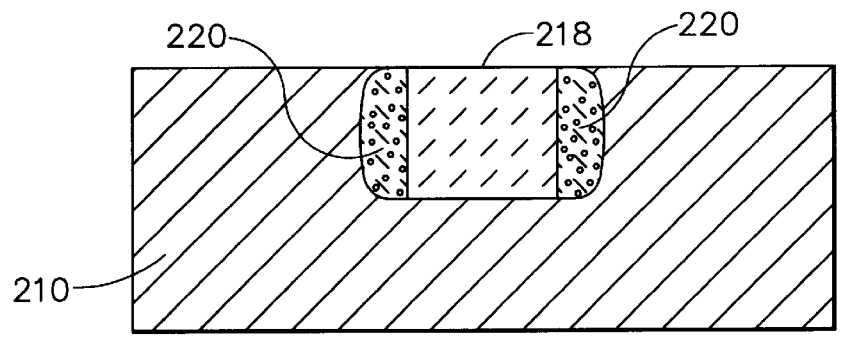
Figure 9:
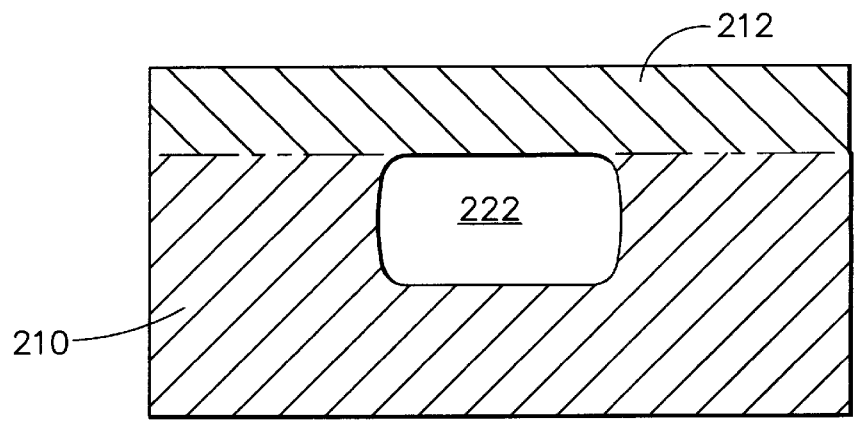

In the second embodiment of the invention, represented by FIGS. 7 through 9, a skin 212 is again deposited over a substrate (spar) 210 having a groove 214 formed in its surface 216. In contrast to the groove 114 of FIGS. 4 through 6, the groove 214 intentionally incorporates an inwardly-projecting extension 215 along its edge with the surface 216 of the substrate 210. The extension 215 prevents the formation of a sharp (less than 90°) notch between the skin 212 and the wall of the groove 214. Also contrary to the first embodiment of this invention, though a solid filler 218 and a particulate filler 220 are again used to completely fill the groove 214 as shown in FIG. 8, both are sacrificial to the process, and are removed following deposition of the skin 112 to form a cooling channel 222 having the same cross-sectional shape as the original groove 214.

As is evident from FIG. 7, the solid filler 218 is again undersized for the groove 214, creating a void or gap between the filler 218 and the walls of the groove 214. The shape of the solid filler 218 is not as critical as that of the solid filler 118 of the first embodiment, since the former does not determine the shape of the channel 222. As shown in FIG. 8, the particulate filler 220 fills the gap between the solid filler 218 and walls of the groove 214 so that the groove 214 is completely filled prior to deposition of the skin 212. As before, the groove 214 is preferably filled so that, after consolidation, the material within forms a surface substantially coplanar with the surrounding surface 216 of the substrate 210. Also as before, the upper surface of the solid filler 218 is substantially coplanar with the surrounding surface 216 of the substrate 210, so that the skin 212 is deposited directly on the surface of the solid filler 218. Alternatively, the solid filler 218 could be thinner than the depth of the groove 214, in which case the particulate filler 220 would also be required to fill that portion of the groove 214 above the solid filler 218. Preferably, a minimal amount of the particulate filler 220 is used in order to minimize the affect of shrinkage during consolidation. Otherwise, the groove 214 would be required to be overfilled with the filler 220 and then the excess removed after consolidation by machining, which could potentially damage the substrate/filler interface continuity.

Suitable materials for the solid and particulate fillers 218 and 220 must again be compatible with that of the substrate 210 in terms of CTE to prevent the formation of an excessive gap during deposition of the skin 212, thermal conductivity to prevent overheating of the fill surface during deposition, and compositional compatibility to avoid detrimental interdiffusion during the consolidation and deposition steps. The solid filler 218 and particulate filler 220 are both preferably removed by etching, necessitating that each is formed of a material that can be preferentially etched from the substrate 210. Consolidation of the particulate filler 220 within the groove 214 and deposition of the skin 212 can be performed using the techniques discussed in reference to the first embodiment of the invention.

While the invention has been described in terms of a preferred embodiment, it is apparent that other forms could be adopted by one skilled in the art. Therefore, the scope of the invention is to be limited only by the following claims.

What is claimed is:

1. A method of forming a channel in an article, the method comprising the steps of:

forming a substrate having a surface and a groove recessed in the surface;

placing a solid member in the groove so as to partially fill the groove and leave a void therein;

filling the void with a fill material so that the groove is completely filled;

depositing a layer on the surface of the substrate and over the solid member and the fill material in the groove; and then removing the solid member from the groove so as to form a channel in the substrate and beneath the layer.

2. A method as recited in claim 1, wherein the solid member has a surface that is substantially coplanar with the surface of the substrate when the solid member is placed in the groove.

3. A method as recited in claim 1, wherein the layer is directly deposited on a surface of the solid member during the depositing step.

4. A method as recited in claim 1, further comprising the step of removing the fill material from the groove after the depositing step.

5. A method as recited in claim 1, further comprising the step of bonding the fill material to the substrate after the filling step, the fill material remaining in the groove after the removing step and forming a wall of the channel.

6. A method as recited in claim 1, wherein the fill material comprises a metal powder.

7. A method as recited in claim 1, further comprising the step of consolidating the solid member and the fill material after the filling step.

8. A method as recited in claim 1, further comprising the step of forming the groove to have an edge at the surface of the substrate, the edge projecting over the groove.

9. A method as recited in claim 1, wherein the article is a component of a gas turbine engine.

10. A method of forming a channel in an article, the method comprising the steps of:

forming a substrate having a surface and a groove recessed in the surface;

placing a solid member in the groove so as to partially fill the groove and leave a void therein, the solid member being formed of a material chosen from the group consisting of nickel-based and iron-based alloys;

filling the void with a fill material so that the groove is completely filled, the fill material comprising a metallic powder;

consolidating the solid member and the fill material so that the fill material forms a solid mass that is bonded to the substrate and so that the solid member and the solid mass form a fill surface that is substantially coplanar with the surface of the substrate;

forming a layer on the fill surface and on the surface of the substrate using a physical vapor deposition technique; and then etching the solid member from the groove so as to form a channel in the substrate and beneath the layer, the solid mass remaining in the groove and forming a wall of the channel.

11. A method as recited in claim 10, wherein the fill material comprises a mixture of metal powders, at least one of the metal powders containing a melting point depressant, the metal powders at least partially dissolving into each other during the consolidation step.

12. A method as recited in claim 10, wherein the substrate has at least two grooves in the surface and the solid member has portions received in the at least two grooves.

13. A method as recited in claim 10, wherein the article comprises an airfoil of a gas turbine engine.

14. A method of forming a channel in an article, the method comprising the steps of:

forming a substrate having a surface;

forming a groove in the substrate to have an edge at the surface of the substrate, the edge projecting over the groove;

placing a solid member in the groove so as to partially fill the groove and leave a void therein, the solid member being formed of a material chosen from the group consisting of nickel-based and iron-based alloys;

filling the void with a fill material so that the groove is completely filled, the fill material comprising a metallic powder;

consolidating the solid member and the fill material so that the solid member and the fill member form a fill surface that is substantially coplanar with the surface of the substrate;

forming a layer on the fill surface and on the surface of the substrate using a physical vapor deposition technique; and then etching the solid member and the fill material from the groove so as to form a channel in the substrate and beneath the layer.

15. A method as recited in claim 14, wherein the solid member and the metallic powder of the fill material are formed of the same alloy.

16. A method as recited in claim 14, wherein the substrate has at least two grooves in the surface and the solid member is received in each of the at least two grooves.

17. A method as recited in claim 14, wherein the article comprises an airfoil of a gas turbine engine.

18. A method as recited in claim 1, wherein said fill material is a particulate material.

* * * * *